April 2, 1940. A. NUTTING 2,195,707
SEPARATION OF PARTICLES FROM GASES
Filed Jan. 5, 1938 3 Sheets-Sheet 2
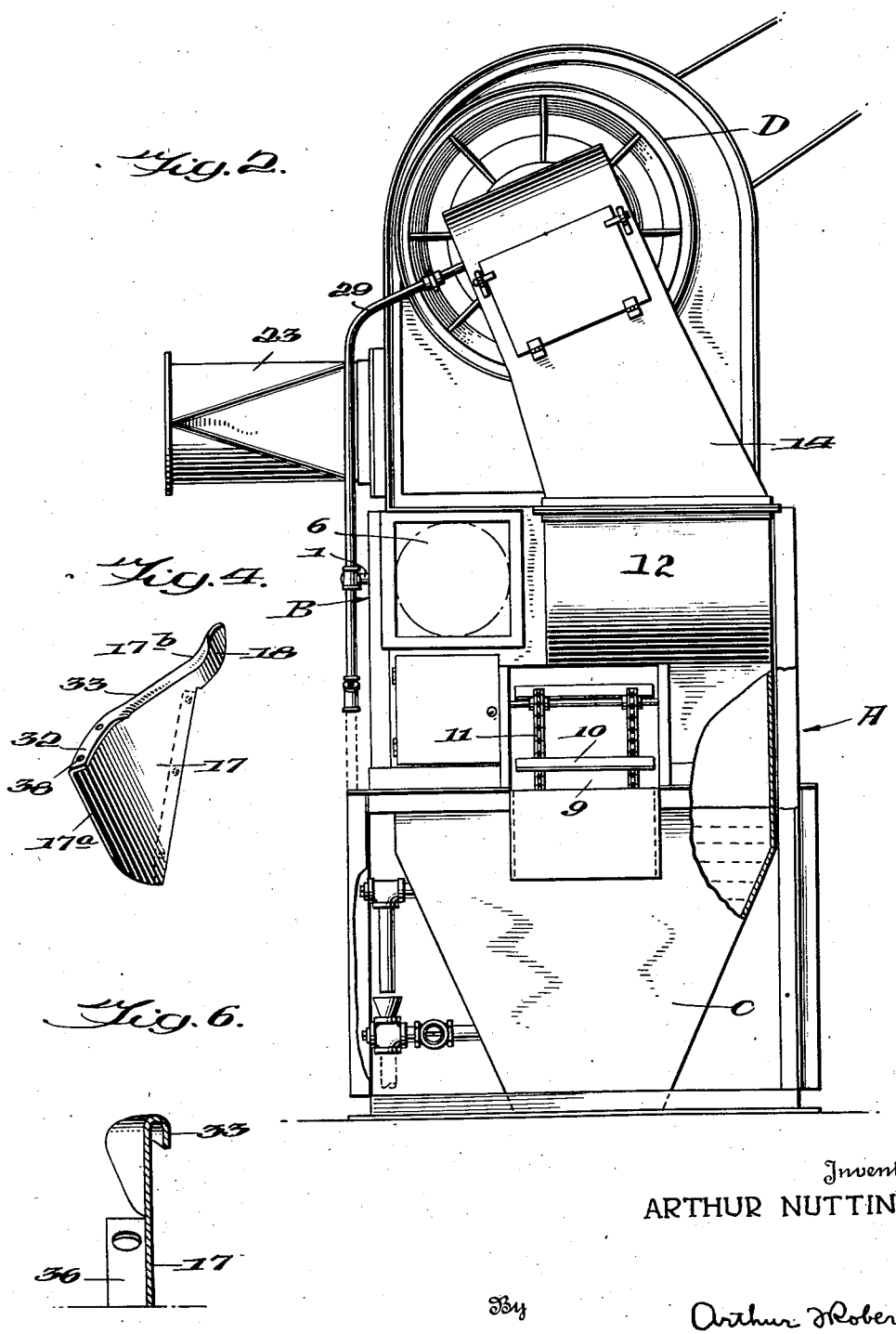
Inventor
ARTHUR NUTTING
By Arthur J. Robert
Attorney

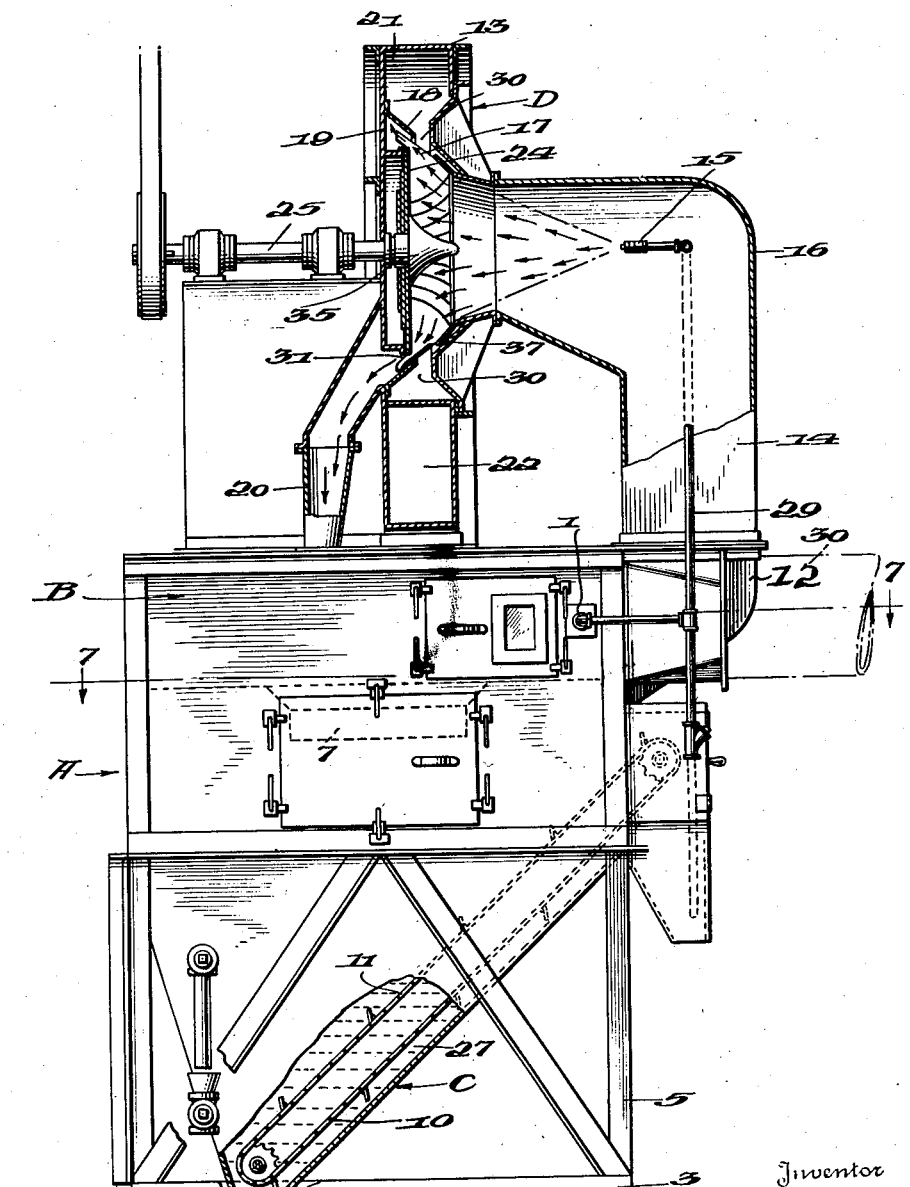

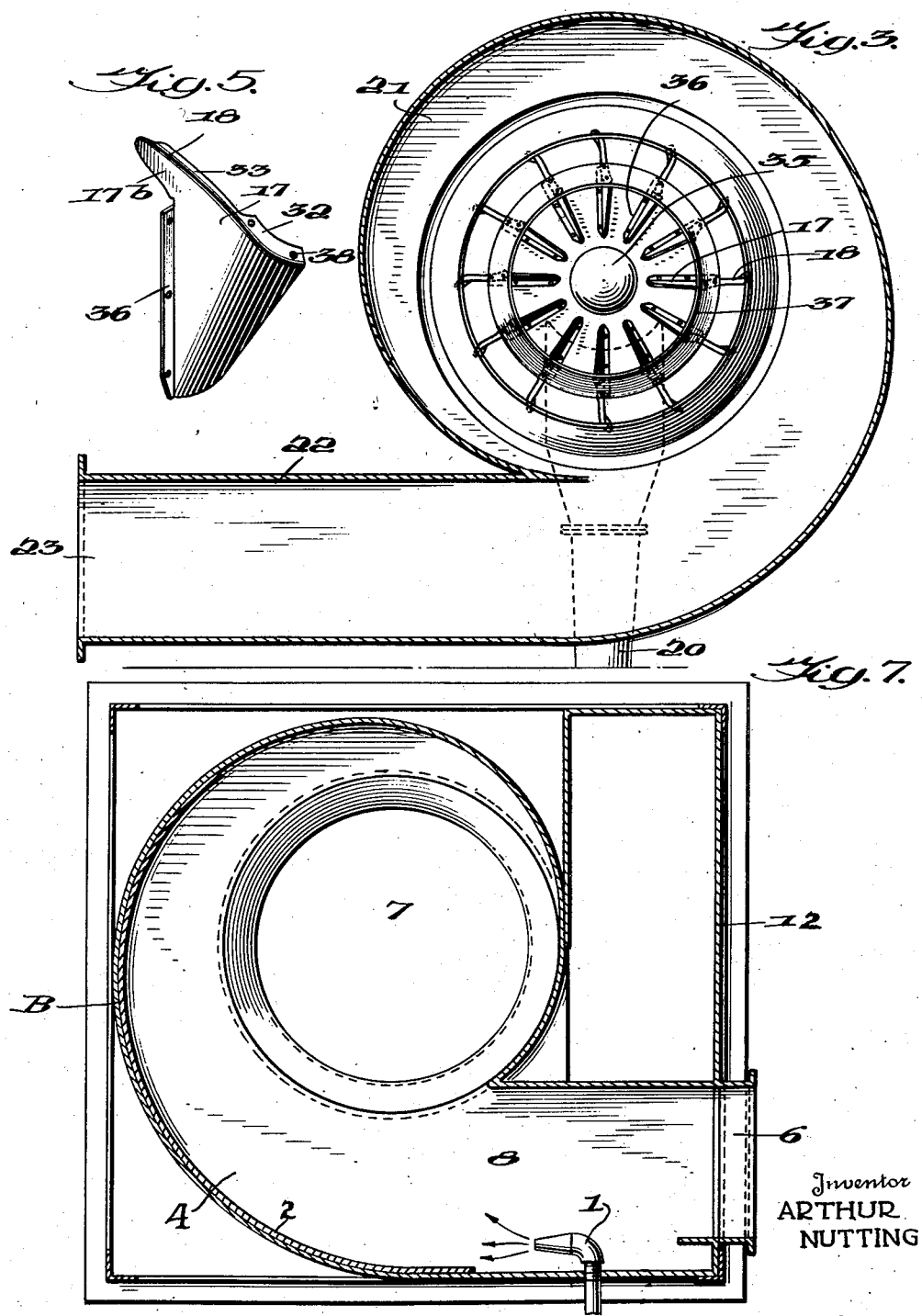

Patented Apr. 2, 1940

2,195,707

UNITED STATES PATENT OFFICE 2,195,707

SEPARATION OF PARTICLES FROM GASES

Arthur Nutting, Louisville, Ky., assignor to American Air Filter Company, Inc., Louisville, Ky., a corporation of Delaware Application January 5, 1938, Serial No. 183,428

5 Claims. (Cl. 183—21)

This invention relates to the separation of liquid and solid particles from gases and particularly to methods and apparatus in which separation and precipitation of such particles are effected by a whirling or centrifugal movement imparted to the particle-laden air or gas.

The invention is adapted for general use in separating particles from gases encountered in the industrial, chemical and ventilating fields and is particularly suited for the control and collection of dusts in industrial plants and factories.

The general purposes of the invention are the effective removal and collection of particles of various characters and sizes from gas and the provision of means which will have a high separation efficiency upon light fine particles (such as fine clay, dust from tumbling mills, dusts from grinders, and dust from operations involving chemicals, vitreous enamels, silicas, pigments and talc), and which will handle efficiently and without plugging particles which have a packing tendency when dry.

More specifically the invention pertains to an apparatus for particle separation in which the scrubbing effect of water or other liquids is effectively combined with dynamic precipitation produced by the whirling action of the particle-laden gas.

Among the principal objects of the invention are constant gas or air delivery; maximum particle separation or precipitation; minimum liquid spray consumption; prevention of wear of the surfaces contacted by abrasive materials carried by the gas stream; and incorporation of an economical combined exhauster and dust separator in a single compact easily installed unit, with minimum requirements as to space and supporting structure or foundation.

Heretofore particle separation and gas cleansing have been effected by subjecting the particle-laden gas to whirling or centrifugal action, or by treating the gas with a liquid. Efforts to increase the effectiveness of centrifugal separation by introducing moisture into the gas stream have been found unsatisfactory, especially in room, building or factory installations, because of the complicated structures employed, or the manner of disposition and arrangement of the moisture-introducing means.

My invention resides, in part, in so designing and constructing a particle-separation apparatus as to create and utilize dynamic forces effectively to precipitate particles on the particle-receiving surfaces and in so applying the treating liquid to such surfaces as to wet the precipitated particles thoroughly, whereby the certainty of their ultimate separation is substantially enhanced.

The apparatus which I have designed as a specific embodiment of the invention includes certain improvements in the configuration and arrangement of the gas passages; in the manner of association therewith of the treating liquid for wetting the particle-receiving surfaces of the gas passages and producing a scrubbing effect upon the particle-laden gas; in the particular manner of distribution of the liquid sprays relative to the gas stream; and in the particular location and relationship of the several parts or elements of the apparatus.

The apparatus comprises, as its main elements, preferably enclosed in a single unitary casing, a precleaner having a gas inlet, a sludge collector hopper connected with the precleaner outlet and a rotary centrifugal precipitator connected with the gas outlet of the sludge collector hopper, the precipitator having separate discharge passages for cleaned gas and for sludge, i. e., precipitated particles and liquids. The rotary impeller of the centrifugal precipitator, provided with specially shaped blades, creates, when rotated, the forces necessary to draw in the particle-laden gas, separate and precipitate the particles and expel the cleaned gas.

In the preferred embodiment of the invention illustrated in the drawings the precleaner is in the form of an involute chamber or passage disposed horizontally and having a tangential inlet for gas to be treated and a bottom outlet which is located immediately above the sludge collector hopper, while the rotary centrifugal precipitator is of the conventional form shown in Patent No. 1,941,449, in that it has an axial inlet leading to a more or less radial centrifuging passage which discharges sludge into one annular chamber and cleaned gas into another, the latter preferably being of convolute form. The liquid is supplied directly to the involute wall of the precleaner in any manner certain of thoroughly wetting that wall, as by spraying it from a position adjacent the gas inlet end of the involute wall and in the general direction of the air flow. Additional liquid is also sprayed directly into the impeller of the rotary precipitator to keep the blades thereof thoroughly and constantly wetted. The preliminary wet cleansing operation effected in the precleaner is thus supplemented by a second wet cleansing operation in the rotary precipitator.

The liquid sprays thus incorporated in the apparatus provide wet films to which precipitate particles firmly adhere and by which they are conveyed, while both the precleaner and the impeller provide predetermined or set paths for the controlled flow of the wet film. This film, maintained between the particles and the surfaces of the precleaner and the impeller, not only produces a high separating efficiency, but also effectively retards wear, which is an important factor, particularly where abrasive materials are concerned. For usual applications approximately 20 gallons of liquid per hour for each 1000 c. f. m. exhausted is required by each set of liquid sprays, i. e., the precleaner and the impeller sets.

In the drawings:

Figure 1 is a vertical front elevational view of the apparatus with parts of the casing broken away.

Fig. 2 is a vertical side elevational view taken from the right hand side of Fig. 1.

Fig. 3 is a vertical side elevational view of the interior of the impeller casing shown at the top of Fig. 2, the side wall of the casing being removed.

Figs. 4 and 5 are perspective views from opposite sides of one of the blades of the impeller shown in Fig. 3.

Fig. 6 is a fragmentary detail longitudinal sectional view of the blade shown in Fig. 5, and Fig. 7 is a horizontal sectional view taken on line 7—7 of Fig. 1.

In the preferred embodiment of my invention the parts of the apparatus are enclosed by a casing A within which are arranged in compact relation the precleaner B, sludge collecting hopper C and impeller D.

Any suitable or convenient means may be provided for supporting the apparatus, that shown comprising a base 3 and legs or standards 5.

The precleaner consists of a gas chambered header having its vertical walls 2 preferably arranged to form, with the top and bottom walls 4, a horizontally disposed involute passage 8. This passage has a tangentially disposed gas inlet 6, in communication with a gas supply pipe 30 or other source of dust-laden gas, and a bottom outlet 7 in communication with the sludge collector hopper.

The involute wall is thoroughly wetted in any suitable manner, as by placing one or more spray nozzles 1 within the passage 8, preferably adjacent the inlet end of the involute wall 2 and so disposed as to inject liquid sprays into the passage 8 and in the general direction of the entering gas.

The centrifugal action exerted upon the incoming gas in passage 8 forces the heavier suspended solid particles into contact with the wet surface of the involute wall. Particles thus wetted will readily move along the wall with the water, but will not readily reenter the gas stream. As the operation proceeds the wetted precipitated particles (or sludge) is forced, by the gas flow, to move along the walls of the precleaner in the general direction of the gas flow and is thus ultimately brought to and discharged through the bottom outlet 7 into the sludge hopper. With peak volumes of gas, the sludge in passage 8 normally may travel along the involute wall with the air, ultimately entering the opening 7 near the end of the involute. With less volume, the travel should be less.

The hopper C is of closed watertight construction to contain a supply of liquid 27, the level of which normally stands slightly above the overflow pipe and as much below the precleaner outlet 7 as the diameter of that outlet. With this level, the whirling gas stream discharged from the involute passage 8 will strike the surface of the hopper liquid and thus remove some of the particles which remained in the gas after its passage through the precleaner B.

The sludge in hopper C may be disposed of in any desired manner. For example, it may be pumped or otherwise conveyed to settling tanks or basins. Or the dust may be allowed to settle in the hopper and may be removed therefrom through a valved bottom outlet (not shown).

For large installations or heavy particle loads the hopper may be equipped with a sludge-removing conveyor 10, which may be operated either intermittently or continuously, to discharge the deposited sludge from the apparatus through an opening 9 provided for this purpose. The conveyor, however, is not a necessary part of the apparatus.

The liquid in the hopper C normally will be allowed to escape to the sewer and will not be reused, since the saving entailed in reuse is usually not sufficient to warrant it. However, when warranted, it may be cleaned by settling or otherwise.

The upper part of the hopper C, above the liquid level, constitutes a gas chamber having a gas outlet 12. It will be noted that the gas-flow area provided by this chamber between the bottom opening or gas-sludge outlet 7 and the gas outlet 12 is substantially larger than the flow area of said bottom opening. The purpose of this enlargement is to reduce the flow velocity within the chamber sufficiently to insure the gravity separation of all sludge from the gas and, at the same time, to avoid any appreciable loss of gas pressure within the chamber. The chamber is connected through outlet 12 with the casing 13 of the impeller D by means of duct 14. The discharge end of duct 14 is so disposed as to direct the gas axially into the rotary centrifugal precipitator. For the purpose of constantly wetting the precipitator impeller and effecting a supplemental or secondary scrubbing and cleansing of the gas, a liquid spray nozzle 15 is inserted into duct 14, preferably at the bend or elbow 16 and in alignment with the impeller axis.

The liquid supply for sprays 1 and 15 may be obtained from a suitable source of fresh liquid or, if the used liquid from hopper C is properly cleaned, it may be reused.

During rotation, the wet blades 17 of the impeller strike and thus precipitate the gas borne particles, forming a sludge on the blade surfaces. The design of the impeller is such as to cause this sludge to travel to the blade tips 18, from which it is discharged into the sludge chamber 19 with approximately 10 per cent of the entering gas, while permitting the clean gas to pass outwardly from the centrifuging passage through the outwardly diverging annular throat passage 30 to the clean air scroll 21. The scroll 21 may be connected by a passage 22 to a suitable gas outlet 23, which may communicate with a room or discharge either into the outside atmosphere or into ducts leading to other equipment. The sludge in chamber 19 may be discharged directly into hopper C, but preferably is returned to the precleaner B through pipe 20 which discharges it upon the bottom wall of the precleaner, preferably at a point adjacent the beginning of the involute of the gas passage 8. By returning the sludge to this point it is thus effectively used additionally to wet the precleaner walls and thus more certainly insure their being thoroughly wetted. This sludge, like the sludge initially formed in the precleaner, passes along the walls of the precleaner, ultimately reaching the hopper.

The impeller included in the specific embodiment illustrated is of a special structural design for most effectively accomplishing the separation of foreign particles from the gas. It comprises, generally, a series of blades 17 formed with flanges 36 by which they are secured in substantially edgewise annular relation about the cone-shaped core tip 35 to the face 24 of the impeller, which is mounted on a suitable drive shaft 25. The blades 17 are provided with tips 18 which are positioned in the annular passage 31 connecting the sludge chamber 19 with the passage 30. The blades 17 are so formed that their advancing faces have a concave curvature 17a, the faces of tips 18 having a convex shape 17b. The outer edge of each of the blades 17 is provided with a flange 32, which is bent over to form a hook 33 to restrain the escape of foreign particles radially into the clean air scroll.

The blades 17 may be held in properly spaced position by a ring 37 secured to flanges 32 by rivets or bolts passed through apertures 38.

The structure and arrangement of the tips of the blades on the impeller are described and claimed in my copending application Serial #222,405 filed August 1, 1938.

In the operation of the apparatus particle-laden gas is drawn into the precleaner B by the suction created by the impeller D. The liquid jet or jets 1, adjacent the inlet opening 6, maintain the involute wall of the precleaner constantly wetted. The centrifugal forces set up in passage 8 cause the heavier particles and some fines to impinge upon the wet involute wall. The wetted particles which are not immediately precipitated pass with the gas downwardly through the precleaner's bottom outlet 7 into contact with the liquid 27 in the sludge collecting hopper C.

The involute form of the precleaner passage causes the gas current to be constantly changed in direction and brought against the side walls 2. The whirling movement of the gas delays its escape through outlet 7 and thus effects a more intimate contact of gas and liquid over a longer period of time, thereby enhancing the possibility of particle precipitation. As a result of the precipitation, a sludge is formed in the precleaner which eventually runs off the walls and escapes through the bottom outlet 7 into the hopper C.

The liquid bath 27 to which the gas is subjected as it passes from the precleaner has a high efficiency upon heavy particles. It effectively removes the large particles or long fibers and, in combination with the precleaner, precipitates from 60% to 90% of the original suspended matter, depending upon its character. The treatment thus bestowed upon the gas rids it of matter which would clog, wear or otherwise interfere with the operating efficiency or life of the dynamic precipitator through which the gas is subsequently passed in the apparatus employed in carrying out my improved method of particle separation.

The finer particles which remain suspended after the precleaner treatment and the liquid bath treatment in the hopper C are carried by the gas stream, through duct 14, to the impeller D in casing 13. The duct is especially designed and proportioned to provide an area large enough to insure a low rate of gas flow from the precleaner and thus not only avoid the creation of a turbulent water condition in the hopper, but also avoid any carrying over of sludge into the duct. As the flow approaches the impeller its direction is changed by the bend 16, so that it flows axially into the impeller. The spray 15 sprays water or other liquid through the axial portion of the air stream directly into the impeller.

As the result of the rotary action of the blades, the particles are precipitated on the surfaces of the impeller blades 17 and adhere to or beat against their wetted advancing faces. The fines are thus removed and the resulting sludge largely forced, by the blade design, to travel directly to the sludge chamber annular inlet. Any sludge initially escaping travels to the sludge inlet and, passing to the outer or clean air edge of a blade, is caught by the hook 33 thereon and again directed to the sludge chamber.

The cleaned gas passes through passage 30 into the scroll 21 and thence to the outlet 23. The liquid and particles, passing along the channels provided by the hooked edges 33 of the blades 17 to their tips 18, pass along with the secondary gas current maintained in the annular sludge chamber 19 and are conveyed thereby through the sludge discharge pipe 20 to precleaner B.

My invention is not limited to the specific embodiment shown and described, which is merely illustrative. The invention is capable of other applications and embodiments within the spirit and scope of the specification and claims, as will be apparent to those skilled in the art.

I claim:

1. An apparatus for separating particles from gas, comprising: means defining a horizontally curving involute gas passage for the centripetal flow of gas from an inlet adjacent one end of the passage to a bottom outlet adjacent the other end thereof, said means including an involute side wall against which particles are centrifuged; means for flowing over said side wall, a liquid which combines with the centrifuged particles to form a sludge; said passage defining means constraining the sludge to flow toward and ultimately discharge with the gas through said bottom opening; and a receptacle positioned below said outlet in open communication therewith to receive the sludge and gas, said receptacle having a gas outlet and providing, between it and said bottom opening, a gas-flow area substantially larger than the flow area of said bottom opening.

2. An apparatus for separating particles from gas, comprising: a hollow header having a horizontally directed tangential inlet, a vertically directed bottom outlet, and an involute passage for the centripetal flow of gas horizontally from said inlet to said outlet, said header including an involute side wall against and along which the gas in said passage flows and upon which particles in the gas are centrifuged; means for flowing over said side wall a liquid which combines with the centrifuged particles to form a sludge; the walls of said header constraining the sludge to flow toward and ultimately discharge with the gas thru said bottom opening; and a closed sludge receiver positioned below said header in open communication with the bottom outlet thereof to receive the discharge therefrom, said receiver having a gas outlet and providing, between it and said bottom opening, a gas-flow area substantially larger than the flow area of said bottom opening.

3. An apparatus for separating particles from gas, comprising: a header having top, bottom and involute side walls cooperating to form an involute passage for the centripetal flow of gas from a tangential side-wall inlet horizontally to a bottom-wall outlet; spray means for flowing over said involute side wall a liquid, which combines with the centrifuged particles to form a sludge; said walls constraining the sludge to flow toward and ultimately discharge with the gas through said bottom-wall outlet; and a hopper positioned underneath said header and cooperating with the bottom wall thereof to form a closed gas and sludge-receiving chamber, said chamber being arranged to retain the sludge-forming liquid up to a predetermined level and being provided with an outlet for the gas discharged into the space between the bottom wall and the retained liquid, the gas-flow area of said space being substantially larger than the gas-flow area of said bottom-wall outlet.

4. An apparatus for separating particles from gas, comprising the precleaner structure defined in claim 1 in combination with: a wet rotary dust separator of the type having main and secondary flow passages connected by a slot wherein a wet bladed impeller operates to centrifuge gas annularly from an axial inlet outwardly, whereby contained particles are centrifuged against said wet blades to form a sludge thereon, the main flow of gas passing beyond said slot to a main gas outlet, and a secondary flow of gas passing with the sludge through said slot into a secondary gas passage; and means for feeding the gas discharged from said precleaner into said rotary dust separator.

5. An apparatus for separating particles from gas, comprising the precleaner structure defined in claim 1 in combination with: a wet rotary dust separator of the type having main and secondary flow passages connected by a slot wherein a wet bladed impeller operates to centrifuge gas annularly from an axial inlet outwardly, whereby contained particles are centrifuged against said wet blades to form a sludge thereon, the main flow of gas passing beyond said slot to a main gas outlet, and a secondary flow of gas passing with the sludge through said slot into a secondary gas passage mounted on said precleaner; means for feeding the gas discharged from the precleaner into said rotary dust separator; and means for discharging the gas and sludge from the secondary gas passage of the rotary separator into the centrifuging passage of the precleaner in advance of its bottom-wall outlet.

ARTHUR NUTTING.